United States Patent
Ha (12)

(10) Patent No.: US 6,863,143 B2
(45) Date of Patent: Mar. 8, 2005

(54) POWER TRANSMISSION DEVICE FOR AUTOMOBILE

(76) Inventor: Tae-Hwan Ha, 11-902, Byucksan Apt., Hakey-dong, Nowon-gu, Seoul (KR), 139-230

(*) Notice: Subject to any disclaimer, the term of this patent is extended or adjusted under 35 U.S.C. 154(b) by 0 days.

(21) Appl. No.: 10/343,988

(22) PCT Filed: Aug. 9, 2001

(86) PCT No.: PCT/KR01/01353

§ 371 (c)(1),
(2), (4) Date: Apr. 29, 2003

(87) PCT Pub. No.: WO02/12010

PCT Pub. Date: Feb. 14, 2002

(65) Prior Publication Data

US 2003/0159874 A1 Aug. 28, 2003

(30) Foreign Application Priority Data

Aug. 9, 2000 (KR) .......................... 2000-46133

(51) Int. Cl.[7] .......................................... B60K 17/344
(52) U.S. Cl. ........................................ 180/248; 475/204
(58) Field of Search .................... 180/247, 248, 180/249, 250, 233; 475/204, 205, 206

(56) References Cited

U.S. PATENT DOCUMENTS

| | | | | | |
|---|---|---|---|---|---|
| 4,428,452 A | * | 1/1984 | Muraoka et al. | ............ | 180/249 |
| 5,071,396 A | * | 12/1991 | Kobayashi | .................. | 475/249 |
| 5,078,229 A | * | 1/1992 | Kikuchi et al. | ............. | 180/248 |
| 5,188,574 A | * | 2/1993 | Echigo et al. | .............. | 475/206 |
| 5,704,443 A | * | 1/1998 | Janiszewski | ................ | 180/247 |
| 6,142,905 A | * | 11/2000 | Brown et al. | ............... | 475/206 |
| 6,551,211 B2 | * | 4/2003 | Kanazawa | ................... | 475/206 |
| 2003/0146035 A1 | * | 8/2003 | Satou et al. | ................ | 180/248 |

* cited by examiner

*Primary Examiner*—Avraham Lerner
(74) *Attorney, Agent, or Firm*—McDonnell Boehnen Hulbert & Berghoff LLP

(57) ABSTRACT

Power transmission device for automobile is disclosed. The power transmission device for automobile comprises a driving shaft (10), an output shaft (30) a transmission (20), a differential gear part (50) and a four-wheel drive part (60). The driving shaft (10) has a plurality of driving gears (12), each of them having a different diameter respectively. The driving shaft (10) is connected to an engine (E). The output shaft (30) is a hollow shaft and outputs power from the driving shaft (10). The transmission (20) has a plurality of speed change gears (22) meshing continuously with the driving gears (12) and also has a brake member braking the speed change gears (22) selectively to transfer power to the output shaft (30). The differential gear part (50) is located at an end portion of the output shaft (30) and controls the amounts of rotation of both right and left front wheels (42). The four-wheel drive part (60) is fixed on the output shaft (30) and transfers power to rear wheels (44) selectively. The power transmission device for automobile controls effectively the amounts of rotation of the wheels and provides a configuration for four-wheel drive device which is simple and compact.

3 Claims, 4 Drawing Sheets

POWER TRANSMISSION DEVICE FOR AUTOMOBILE

TECHNICAL FIELD

This invention relates to power transmission device for automobile, and more particularly, to power transmission which can effectively drive both front and rear wheels by operation of a gearbox having a plurality of planetary gears.

BACKGROUND ART

An automobile is provided with power transmission device for transmitting engine power to front or rear wheels.

Generally, the power transmission device consists of a clutch, a gearbox, a differential gear, etc. The clutch couples two working parts in such a way as to permit connection or disconnection at will without the necessity of bringing both parts to rest. The gearbox is the complete system of gear wheels for changing the speed from that of an input shaft to that of an output shaft, or changing the direction of rotation of a shaft with or without a speed change. The differential gear is an arrangement of gears that allows one driving wheel of a car to turn faster than the other when the car goes around a corner.

Various power transmission devices have been designed, and some of them have been disclosed in patent gazette.

A power transmission device with multiple overdrive is disclosed in U.S. Ser. No. 09/476,616 by the applicant of this application. A gearbox comprises a plurality of speed change gears provided with a carrier having a specific shape. Accordingly as a carrier of one of the speed change gears is selectively engaged so as to select a desired speed and direction of output torque, the power transmission device accomplishes speed change operation effectively. Also, the power transmission device can be automatically operated, and the configuration thereof is simple and compact.

However, it is difficult to control wheel speed because the configuration between the output shaft on which speed change gears are coaxially fixed and the wheels is complicated. That is, if normal final reduction gear and differential gear is used, it is difficult to control wheel speed, because the configuration of this power transmission device is different from that of a conventional power transmission device.

Additionally, a conventional four-wheel drive for transmitting power to both front and rear wheels is complicated in the structural aspect, and cannot accomplish multiple-stage speed change operation effectively. That is, the four-wheel drive according to the prior art is installed at one portion of a speed change device, and a device to selectively connect the speed change device to the four-wheel drive is complicated in the structural aspect, thus it is impossible to change an output speed in multiple-stage.

DETAILED DESCRIPTION OF THE INVENTION

In view of the prior art described above, including the disadvantages and deficiencies of the prior art, it is an object of the present invention to provide a four-wheel drive device being capable of effectively controlling the speed of left and right wheels, and transmitting engine power to both front and rear wheels with simple configuration.

To accomplish the above-mentioned object, the power transmission device according to this invention comprises a driving shaft having a plurality of driving gears and connected to an engine, each of the driving gears having a different diameter respectively; a hollow output shaft for outputting power transferred from the driving shaft; a transmission for changing the speed of the output shaft, the transmission comprising a plurality of speed change gears continuously meshing with the driving gears and coaxially aligned with the output shaft, and a brake member engaging the speed change gears selectively; a differential gear part for allowing one wheel to turn faster than the other wheel, the differential gear part installed at the end of the output shaft; and a four-wheel drive part for transmitting power to both front and rear wheels, the four-wheel drive part installed at a portion of the output shaft.

The differential gear part may comprise a differential gear case containing a pair of differential pinions and installed at the end of the output shaft; left and right side gears installed in the differential gear case and meshing with the differential pinions; a left axle having one end connected to the left side gear and the other end connected to a left wheel via the hollow portion of the output shaft; and a right axle having one end connected to the right side gear and the other end connected to a right wheel.

The four-wheel drive part may comprise a sun gear having an outer teeth on an outer surface thereof and coaxially aligned with the output shaft; a plurality of planetary pinions meshing with the outer surface of the sun gear and rotatably supported by a carrier; a ring gear having inner surface on which inner teeth are meshing with the planetary pinions, and outer surface on which outer teeth are shaped like bevel wheel; a controller for controlling transmission of power to the rear wheels by engaging or releasing the carrier; and a driving pinion meshing at the right angle with the outer teeth of the ring gear, the driving pinion connected to a propeller shaft for transmitting power to the rear wheels.

BEST MODE FOR CARRYING OUT THE INVENTION

Hereinafter, preferred embodiments according to the present invention will be described in detail with reference to the drawings.

Figure 1:
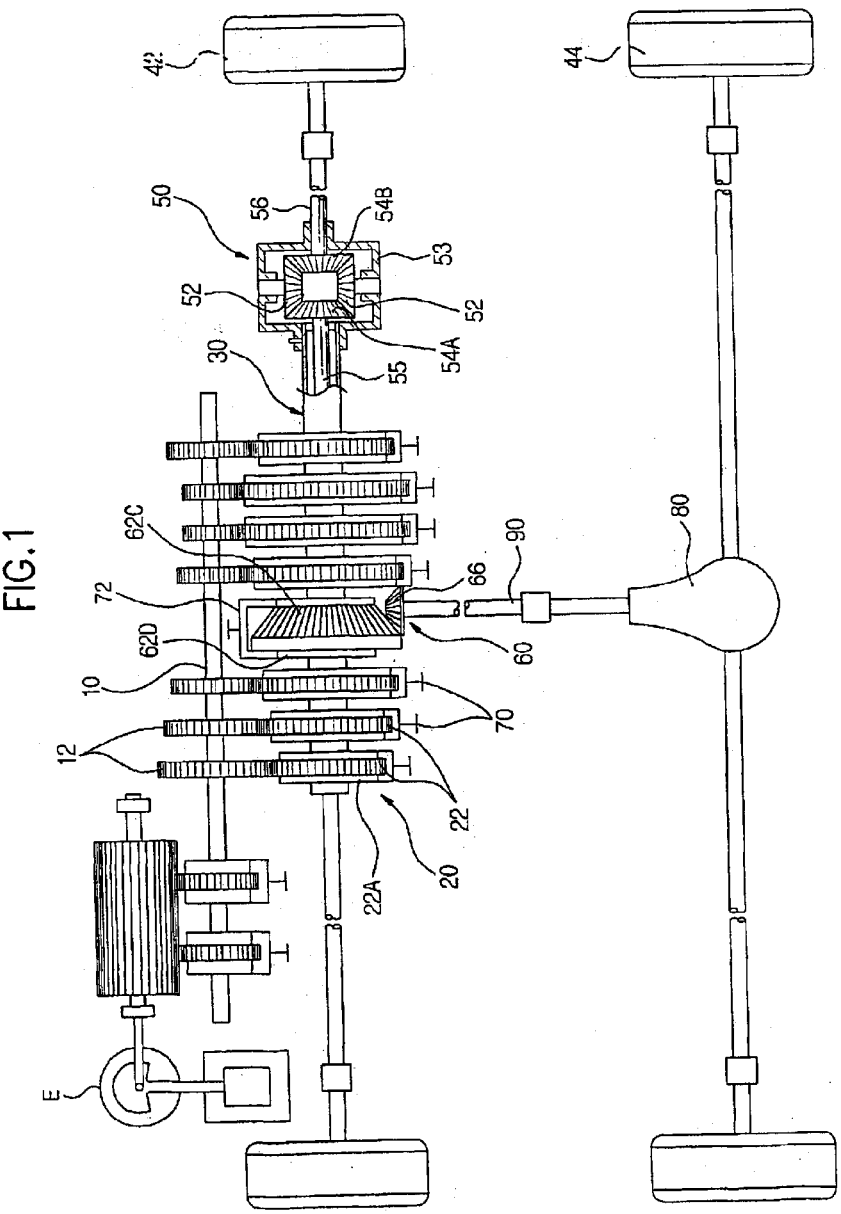
FIG. 1 is a schematic view showing the configuration of a preferred embodiment of the power transmission device according to the present invention.

FIG. 1 is a schematic view showing the configuration of a preferred embodiment of the power transmission device according to the present invention.

As shown in FIG. 1, the power transmission device according to the present invention comprises a driving shaft 10 connected to an engine E, a transmission 20, a differential gear part 50, a four-wheel drive gear 60, and an output shaft 30.

Driving gears 12 are fixed on the driving shaft 10 and have a different diameter respectively. The transmission 20 comprises a plurality of speed change gears 22 and a brake member 70. The speed change gears 22 are continuously meshing with the driving gears 12. The brake member 70 brakes the speed change gears 22 selectively.

The driving shaft 10, the transmission 20, and the brake member 70 will be described schematically because they are disclosed in U.S. patent application Ser. No. 09/476,616 mentioned in the prior art.

The driving shaft 10 is connected to an output shaft of an engine E. The speed change gears 22 of the transmission 20 are continuously meshing with the driving gears 12 of the driving shaft 10. Since a driver operates the brake member 70 by operating a speed change lever or a speed change button, the brake member 70 engages a selected carrier 22A of the speed change gear 22. Thus, the power of the driving gear 12 is transferred to the output shaft 30 via the speed change gear 22. On the contrary, if a driver releases the brake member 70 from the carrier 22A, the power of the driving gear 12 isn't transferred to the output shaft 30.

The brake member 70 controls power transmission to the output shaft 30 by braking or releasing the carrier 22A. As described in U.S. Ser. No. 09/476,616 stated in the prior art section of this application, the brake member 70 may comprise a brake shoe for making contact and causing friction with outer face of the carrier 22A, a push rod for pushing or pulling the brake shoe, a hydraulic drive member for driving the push rod, and a select lever for driving the hydraulic drive member by generating an electric signal.

In the meanwhile, the output shaft 30 on which each of speed change gears 22 of the transmission 20 is fixed is hollow. Sun gears (not shown) of the speed change gears 22 are coaxially fixed on the outer surface of the output shaft 30. A left axle 55 is inserted via the hollow portion of the output shaft 30. Also, a differential gear part 50 is installed at an end of the output shaft 30.

Figure 2:
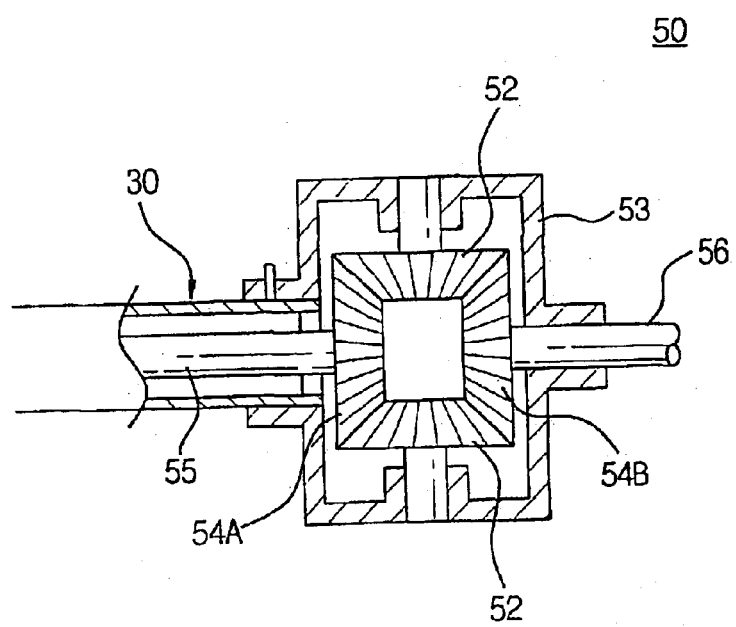
FIG. 2 is a sectional view showing the differential gear part of the power transmission device shown in FIG. 1.

FIG. 2 is a sectional view showing the differential gear part of the power transmission device shown in FIG. 1.

As shown in FIG. 2, the differential gear part 50 comprises a differential gear case 53, a left side gear 54A, a right side gear 54B, a left axle 55, and a right axle 56.

The differential gear part 50 is installed at an end of the output shaft 30. The differential gear part 50 controls the amounts of rotation of left and right wheels with a rotation proportional to the sum or difference of the amounts of rotation of the other two, while driving the front wheels 42 for front wheel drive.

The differential gear case 53 is fixed at the end of the output shaft. A pair of differential pinions 52 are symmetrically installed in the differential gear case 53. The differential pinions 52 rotate or revolve while being supported by the differential gear case 53.

The left and right side gears 54A, 54B are installed at both internal sides of the differential gear case 53 respectively, and each of them is meshing with the differential pinion 52.

An end of the left axle 55 is connected to the left side gear 54A, and the other end of the left axle 55 is connected to a left front wheel 42 via the hollow portion of the output shaft 30. An end of the right axle 56 is connected to the right side gear 54B, and the other end of the right axle 56 is connected to a right front wheel 42.

The output shaft 30 rotates the differential gear case 53, and the differential pinions 52 revolve around the center line of the differential gear case 53. Thus, the differential gear part 50 transmits power of the output shaft 30 to the front wheels 42 for front wheel drive.

A final reduction gear 80 may be installed between the differential gear case 53 and the output shaft 30 in order to reduce the amounts of rotation of the output shaft 30.

The left axle 55 and right axle 56 may have a uniform velocity joint.

The differential gear case 53 and the output shaft 30 may have teeth formed on the outer surface or a connecting portion thereof.

Figure 3:
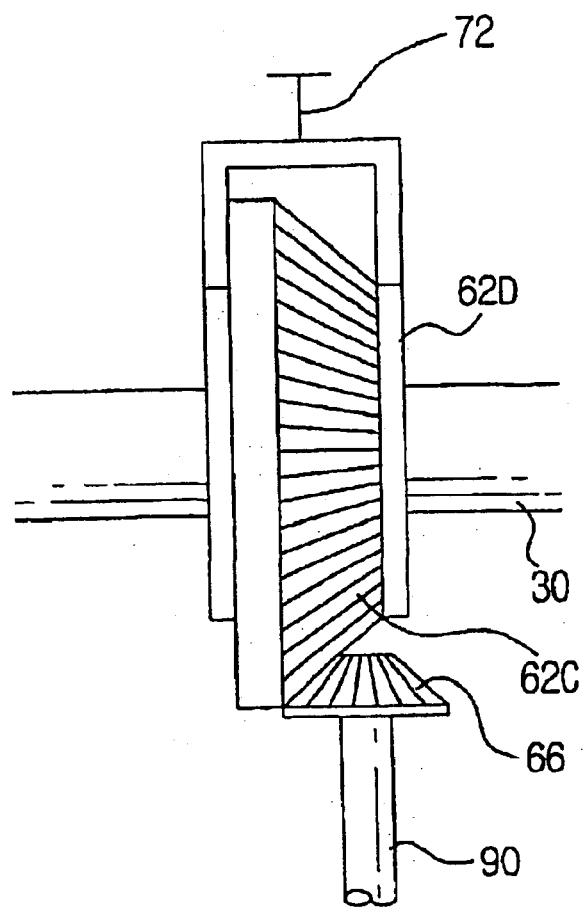
FIG. 3 is a sectional view showing the four-wheel drive part of the power transmission device shown in FIG. 1.
Figure 4:
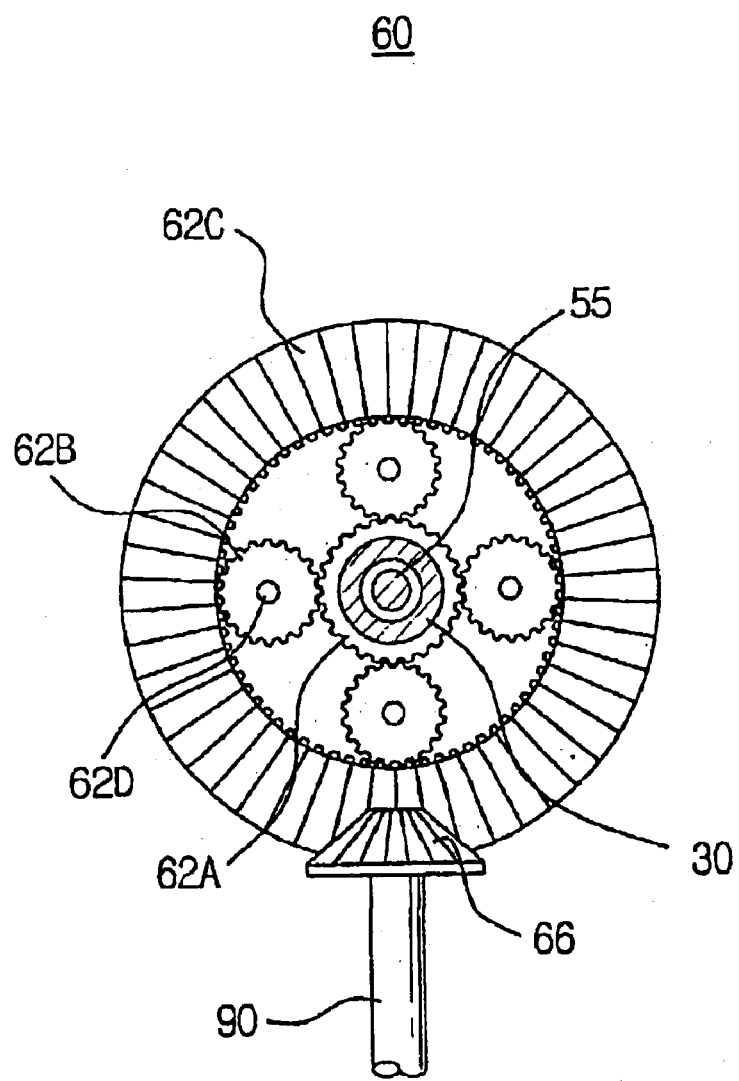
FIG. 4 is a sectional view showing the configuration of the four-wheel drive part shown in FIG. 3.

FIG. 3 is a sectional view showing the four-wheel drive part of the power transmission device shown in FIG. 1. FIG. 4 is a sectional view showing the configuration of the four-wheel drive part shown in FIG. 3.

As shown in FIGS. 3 and 4, the four-wheel drive part 60 comprises a sun gear 62A, a plurality of planetary pinions 62B, a ring gear 62 C, a controller 72, and a driving pinion 66.

The four-wheel drive part 60 is located at a center portion of the output shaft 30. The four-wheel drive part 60 transmits power of the output shaft 30 to rear wheels for front wheel drive in order to drive both front and rear wheels.

The sun gear 62A is coaxially fixed on the center portion of the output shaft 30. The planetary pinions 62B mesh with the outer surface of the sun gear 62A and are rotatably supported by a carrier 62D. The ring gear 62C has opposite sides. Inner and outer teeth are formed on the inner and outer surfaces of the ring gear 62C respectively. The inner teeth mesh with the planetary pinions 62B. The outer surface slopes like bevel wheel.

The carrier 62D is formed symmetrically on both sides of the ring gear 62C.

The driving pinion 66 is connected to a propeller shaft 90 connected to the final reduction gear 80 of the rear wheels 44. The driving pinion 66 meshes with the outer teeth of the ring gear 62C at a right angle.

The controller 72 controls transmitting power to the rear wheels 44 by braking or releasing the carrier 62D. The controller 72 is disclosed in detail in the U.S. patent application Ser. No. 09/476,616 stated as a prior art of this invention. As stated in the U.S. patent application Ser. No. 09/476,616, the controller 72 comprises a brake shoe firmly contacting on the outer surface of the carrier 62D, a push rod for pushing or pulling the brake shoe, a hydraulic drive member for driving the push rod, and a select lever for driving the hydraulic drive member by generating an electric signal.

At a normal condition, power from an engine E is not transmitted to the rear wheels because the controller 72 does not brake the carrier 62D.

In the meanwhile, if a driver operates the selective lever and shifts to four-wheel drive mode, rotational force of the sun gear 62A is transmitted to the ring gear 62C via each of planetary pinions 62B because the controller 72 brakes the carrier 62D. Thus, the rotational force transmitted to the ring gear 62C is transmitted to the rear wheels 44 via the driving pinion 66.

As stated above, the driving pinion 66 is connected to the end of the propeller shaft 90 connected to the final reduction gear 80. The final reduction gear 80 transmits power inputted from the driving pinion 66 to the rear wheels 44 after applying power at a lower rotational speed.

The four-wheel drive part 60 simultaneously driving both front and rear wheels has a simple and compact configuration.

As shown in FIG. 4, the ring gear 62C and the driving pinion 66 may be a hypoid gear, a bevel gear, a spiral bevel gear, a worm gear, etc.

Hereinafter, operations of the preferred embodiment according to the present invention will be described in detail.

The four-wheel drive part 60 is installed at the center portion of the output shaft 30, and the ring gear 62C of the four-wheel drive part 60 meshes with the driving pinion 66. The final reduction gear 80 is connected to the rear wheels 44, and is connected to an end of the propeller shaft 90 of which the other end is connected to the driving pinion 66. The differential gear part 50 is installed at an end of the output shaft 30.

If the engine E operates, the driving gear 12 rotates. In this condition, if a driver operates the speed change button or speed change lever and selects velocity level, the selected brake member 70 brakes the carrier 22A of the selected speed change gear 22.

Thus, a planetary gear meshing with a ring gear and a sun gear of the speed change gear 22 rotates, and then the power of the driving shaft 10 is transmitted to the hollow output shaft 30 via the ring gear, the planetary gear, the sun gear.

The output shaft 30 rotating by the transmitted power rotates the differential gear case 53 of the differential gear part 50, and then the differential pinion 52 revolves and makes the left and right side gears 54A, 54B rotate.

As the left and right side gears 54A, 54B rotate, the left and right axles 55, 56 rotate because they are connected to the left and right side gears 54A, 54B respectively. Thus, power is transmitted to the front wheels 42, and the front wheels 42 rotate.

At this condition, if a front wheel 42, for example, a left front wheel, is under stress, the differential pinion 52 rotates because they are connected to the left side gear 54A which is connected to the left front wheel 42. Thus, the numbers of rotation of the left and right front wheels differ from each other.

In the meanwhile, if a driver operates the four-wheel drive lever or four-wheel drive button while traveling to drive both the front and rear wheels, the controller 70 brakes the carrier 62D of the four-wheel drive part 60.

As the carrier 62D brakes, the rotational force of the sun gear 62A fixed on the output shaft 30 is transmitted to the ring gear 62C via the planetary pinion 62B. Thus, the power transmitted to the ring gear 62C rotates the driving gear 12 meshing with the ring gear 62C, and the rear wheels 44 rotate.

The final reduction gear 80 finally reduces the number of rotations of the propeller shaft 90.

The four-wheel drive part 60 transmits power to both the front and rear wheels to correspond to the speed level selected by a driver. That is, the output rotational speed of the four-wheel drive part 60 is influenced by the gear ratio of the speed change gear 22 that is meshing with the driving gear 12 because the four-wheel drive part 60 does not mesh with the driving gear 12 directly but is installed at the output shaft 30.

If a driver selects first level, the power corresponding to first level is transferred to the output shaft 30 via the speed change gear 22. At this condition, if the driver operates the four-wheel drive part 60, the controller 72 brakes the carrier 62D. Thus, the power corresponding to first level that is transferred to the output shaft 30 is transferred to the driving pinion 66 via the sun gear 62A, the planetary pinion 62B, and the ring gear 62C of the four-wheel drive part 60.

In the meanwhile, if a driver selects $4^{th}$ or $5^{th}$ level, as stated above, the power corresponding to $4^{th}$ or $5^{th}$ level that is transferred to the output shaft 30 is transferred to the driving pinion 66. Also, if a driver selects a backward mode, the power corresponding to the backward mode is transmitted to the driving pinion 66.

Therefore, the four-wheel drive part 60 can accomplish multi-stage speed change without separate devices because it is installed at the output shaft 30.

Also, the power transmission device according to the invention as described above can effectively control the numbers of rotation of the left and right wheels because it has a hollow output shaft of speed change means that consists of planetary gear sets and a differential gear part that is installed at an end of the hollow output shaft.

Also, the configuration of a four-wheel drive part is simple and compact, and power loss is reduced, because the four-wheel drive part is directly installed at the output shaft.

The invention may be embodied in other specific forms without departing from the spirit or essential characteristics thereof the present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A power transmission device for automobiles comprising:
   a driving shaft having a plurality of driving gears and connected to an engine, each of the driving gears having a different diameter respectively;
   a hollow output shaft for outputting power transferred from the driving shaft;
   a transmission for changing the speed of the output shaft, the transmission comprising a plurality of speed change gears continuously meshing with the driving gears and coaxially aligned with the output shaft, and a brake member engaging the speed change gears selectively;
   a differential gear part for allowing one wheel to turn faster than the other wheel, the differential gear part installed at the end of the output shaft; and
   a four-wheel drive part for transmitting power to both front and rear wheels, the four-wheel drive part installed at a portion of the output shaft.

2. The power transmission device for automobiles according to claim 1, wherein the differential gear part comprises:
   a differential gear case containing a pair of differential pinions and installed at the end of the output shaft;
   left and right side gears installed in the differential gear case and meshing with the differential pinions;
   a left axle having one end connected to the left side gear and the other end connected to a left wheel via the hollow portion of the output shaft; and
   a right axle having one end connected to the right side gear and the other end connected to a right wheel.

3. The power transmission device for automobiles according to claim 1, wherein the four-wheel drive part comprises:
   a sun gear having an outer teeth on an outer surface thereof and coaxially aligned with the output shaft;
   a plurality of planetary pinions meshing with the outer teeth of the sun gear and rotatably supported by a carrier;
   a ring gear having an inner surface on which inner teeth are meshing with the planetary pinions, and an outer surface on which outer teeth are shaped like bevel wheel;
   a controller for controlling transmission of power to the rear wheels by engaging or releasing the carrier; and
   a driving pinion meshing at a right angle with the outer teeth of the ring gear, the driving pinion connected to a propeller shaft for transmitting power to the rear wheels.

* * * * *